US011436849B2

(12) United States Patent
Zilberman et al.

(10) Patent No.: US 11,436,849 B2
(45) Date of Patent: Sep. 6, 2022

(54) INTER-CLASS ADAPTIVE THRESHOLD STRUCTURE FOR OBJECT DETECTION

(71) Applicant: Anyvision Interactive Technologies Ltd., Holon (IL)

(72) Inventors: Alexander Zilberman, Holon (IL); Ailon Etshtein, Tel-Aviv (IL); Neil Martin Robertson, Holywood (GB); Sankha Subhra Mukherjee, Belfast (GB); Rolf Hugh Baxter, Holywood (GB); Ishay Sivan, Tel-Aviv (IL); Yaaqov Valero, Petah Tikva (IL)

(73) Assignee: Anyvision Interactive Technologies Ltd., Holon (IL)

( * ) Notice: Subject to any disclaimer, the term of this patent is extended or adjusted under 35 U.S.C. 154(b) by 220 days.

(21) Appl. No.: 16/933,075

(22) Filed: Jul. 20, 2020

(65) Prior Publication Data

US 2021/0034929 A1    Feb. 4, 2021

Related U.S. Application Data

(60) Provisional application No. 62/881,400, filed on Aug. 1, 2019.

(51) Int. Cl.
| G06V 30/194 | (2022.01) |
| G06N 20/00 | (2019.01) |
| G06K 9/62 | (2022.01) |
| G06N 3/08 | (2006.01) |
| G06V 40/16 | (2022.01) |

(52) U.S. Cl.
CPC ......... *G06V 30/194* (2022.01); *G06K 9/6232* (2013.01); *G06N 3/08* (2013.01); *G06N 20/00* (2019.01); *G06V 40/168* (2022.01)

(58) Field of Classification Search
CPC ........ G06V 30/194; G06N 20/00; G06N 3/08; G06K 9/6232
See application file for complete search history.

(56) References Cited

U.S. PATENT DOCUMENTS

| 10,025,950 | B1 * | 7/2018 | Avasarala | G06V 10/82 |
| 2008/0208781 | A1 * | 8/2008 | Snyder | G16H 40/63 706/20 |
| 2019/0347572 | A1 * | 11/2019 | Reeves | G06F 17/18 |
| 2020/0027027 | A1 * | 1/2020 | Reeves | G06N 20/10 |
| 2020/0356840 | A1 * | 11/2020 | Chabanne | G06F 21/32 |

* cited by examiner

*Primary Examiner* — David Bilodeau

(57) ABSTRACT

Provided herein are systems and methods for applying adaptive classes thresholds to enhance object detection Machine Learning (ML) models by receiving a plurality of labeled feature vectors extracted from a plurality of images associated with a plurality of objects, one or more subsets of the plurality of feature vectors are associated with respective object(s) and labeled accordingly, computing an adaptive threshold for each object in a plurality of iterations, each iteration comprising: (1) computing deviation of a respective feature vector of the subset from an aggregated feature vector, (2) computing, in case the deviation is within a predefined value, a threshold enclosing the respective feature vector, and (3) adjusting the adaptive threshold to enclose the threshold of the respective feature vector and outputting the adaptive threshold(s) for classifying unlabeled feature vectors to class(es) of respective object(s) associated with the adaptive threshold(s) in which the unlabeled feature vectors fall.

9 Claims, 6 Drawing Sheets

INTER-CLASS ADAPTIVE THRESHOLD STRUCTURE FOR OBJECT DETECTION

RELATED APPLICATION(S)

This application claims the benefit of priority under 35 USC § 119(e) of U.S. Provisional Patent Application No. 62/881,400 filed on Aug. 1, 2019, the contents of which are all incorporated by reference as if fully set forth herein in their entirety.

FIELD AND BACKGROUND OF THE INVENTION

The present invention, in some embodiments thereof, enhancing performance of objects classification for Machine Learning (ML) models, and, more specifically, but not exclusively, to enhancing performance of objects classification for ML model(s) by classifying feature vectors extracted by ML models based on inter-class adaptive thresholds each computed for a respective one of the objects.

Object detection has become a corner stone for a plurality of applications ranging from military and public order applications to commercial applications and services, for example, face recognition systems, autonomous vehicles, public order systems, security systems, surveillance systems and/or the like.

The immense and rapid advancement in Artificial Intelligence (AI) and Machine Learning (ML) has paved the way for highly efficient object detection using such ML models, in particular with recent major research and development of neural networks which present unprecedented capacities in the detecting and classifying objects and faces based on image analysis.

ML model visual object detection is done by training and learning the ML model to classify the detected objects into classes (labels) based on feature vectors comprising feature extracted from images depicting the object.

SUMMARY OF THE INVENTION

According to a first aspect of the present invention there is provided a computer implemented method of applying adaptive classes thresholds to enhance object detection Machine Learning (ML) models, comprising:
Receiving a plurality of labeled feature vectors extracted from a plurality of images associated with a plurality of objects. One or more subsets of the plurality of feature vectors are associated with respective objects of the plurality of objects and labeled accordingly.
Computing an adaptive threshold for the respective object in a plurality of iterations each for a respective one of the feature vectors of the subset. Each iteration comprising:
Computing a deviation of the respective feature vector from an aggregated feature vector aggregating all previously processed feature vectors of the subset.
Computing, in case the deviation is within a predefined value, a threshold enclosing the respective feature vector by applying one or more ML models to compute similarity with each of the plurality of feature vectors not associated with the respective object.
Adjusting the adaptive threshold to enclose the threshold of the respective feature vector.
Outputting the adaptive threshold for classifying one or more unlabeled feature vectors extracted by one or more ML models from one or more query images to class(es) of respective object(s) in case the respective unlabeled feature vectors fall within the adaptive threshold(s) of the respective object(s).

According to a second aspect of the present invention there is provided a system for applying adaptive classes thresholds to enhance object detection Machine Learning (ML) models, comprising one or more processors executing a code, the code comprising:
Code instructions to receive a plurality of labeled feature vectors extracted from a plurality of images associated with a plurality of objects. One or more subsets of the plurality of feature vectors are associated with respective objects of the plurality of objects and labeled accordingly.
Code instructions to compute an adaptive threshold for the respective object in a plurality of iterations each conducted for a respective one of the feature vectors of the subset. Each iteration comprising:
Computing a deviation of the respective feature vector from an aggregated feature vector aggregating all previously processed feature vectors of the subset.
Computing, in case the deviation is within a predefined value, a threshold enclosing the respective feature vector by applying one or more ML models to compute similarity with each of the plurality of feature vectors not associated with the respective object.
Adjusting the adaptive threshold to enclose the threshold of the respective feature vector.
Code instructions to output the adaptive threshold for classifying one or more unlabeled feature vectors extracted by one or more ML models from one or more query images to class(es) of respective object(s) in case the respective unlabeled feature vectors fall within the adaptive threshold(s) of the respective object(s).

In a further implementation form of the first and/or second aspects, the plurality of objects are faces of people such that the one or more ML models are configured and trained for face recognition.

In a further implementation form of the first and/or second aspects, one or more of the ML models are neural network.

In a further implementation form of the first and/or second aspects, the aggregated feature vector is a common center computed based on the previously processed feature vectors of the subset and the deviation is computed based on a distance of the respective feature vector from the common center.

In a further implementation form of the first and/or second aspects, the threshold and the adaptive threshold define respective multi-dimensional spatial regions having a plurality of dimensions corresponding to the number of features in the plurality of feature vectors.

In a further implementation form of the first and/or second aspects, adjusting the adaptive threshold to enclose the threshold of the respective feature vector comprising adjusting a border line of the multi-dimensional spatial region defining the adaptive threshold to follow the border line of the multi-dimensional spatial region defining the threshold computed for the respective feature vector.

In an optional implementation form of the first and/or second aspects, the border line of the multi-dimensional spatial region defining the adaptive threshold is smoothed.

In a further implementation form of the first and/or second aspects, a respective adaptive threshold is individually adjusted for each of the plurality of objects by adjusting the respective adaptive threshold according to the threshold computed for each feature vector of the plurality of features vectors associated with the respective object having a deviation from a respective aggregated feature vector which is within the predefined value.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks automatically. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

Figure 1:
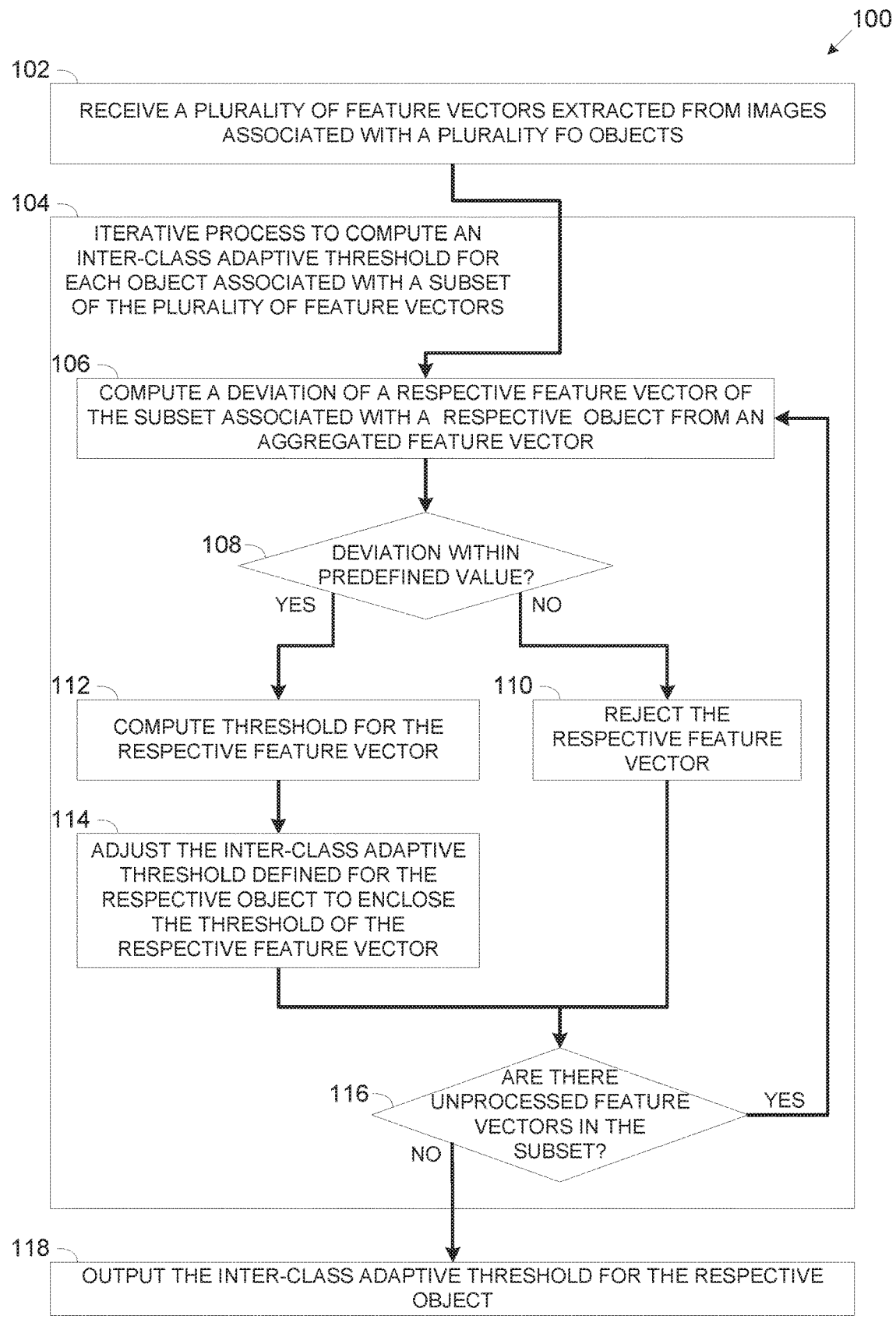
FIG. 1 is a flowchart of an exemplary process of computing an inter-class adaptive threshold for mapping feature vectors extracted by ML model(s) for a plurality of objects and classifying the objects accordingly, according to some embodiments of the present invention.

The present invention, in some embodiments thereof, enhancing performance of objects classification for Machine Learning (ML) models, and, more specifically, but not exclusively, to enhancing performance of objects classification for ML model(s) by classifying feature vectors extracted by ML models based on inter-class adaptive thresholds each computed for a respective one of the objects.

ML models as known in the art, for example, convolutional neural networks, Support Vector Machine (SVM) and/or the like are widely used for a plurality of object detection application, such as, for example, face recognition systems, autonomous vehicles, public order systems, security systems, surveillance systems and/or the like.

The ML models may utilize various neural network technologies such as, for example, Convolutional Neural Networks (CNNs), specifically deep learning CNNs trained for object detection and/or face recognition. Such CNNs may include, for example, LeNet, AlexNet, VGGNet, GoogLeNet, OverFeat, R-CNN, Fast R-CNN, Faster R-CNN, CosFace and/or the like.

ML model's visual object detection as known in the art is based on training and learning the ML model(s) to classify the objects into classes (labels) based on classification of feature vectors comprising feature extracted from images depicting the objects. Each of the classes may be associated with a threshold defined by a spatial region computed based on a plurality of previously extracted feature vectors and used for classification of new feature vectors extracted by the ML model(s). As such, each feature vector may be classified to a respective class (label) which is associated with the threshold region in which the respective feature vector falls.

Efficient classification of the objects may be therefore highly correlated with efficient thresholds defined for the plurality of object classes in order to distinctively and decisively distinguish between the classes.

According to some embodiments of the present invention, there are provided methods, systems and computer program products for computing inter-class adaptive thresholds for a plurality of object classes (labels). The computed inter-class adaptive thresholds may be used to efficiently map feature vectors comprising features extracted by the ML model(s) from images depicting the objects and classifying the objects accordingly thus significantly increasing performance of the objects classification, for example, increased accuracy, increased confidence level, reduced error rate, increased precision, increased recall and/or the like.

The inter-class adaptive thresholds may be computed based on a plurality of feature vectors (labeled or not) associated with a plurality of objects which comprise a plurality of features extracted by the ML model(s) from the objects, specifically from images of the objects. The feature vectors are multi-dimensional vectors having a number of dimensions corresponding to the number of features included in the feature vectors.

The inter-class adaptive threshold may be computed for each of the objects associated with a subset of feature vectors in an iterative process in which in each iteration a respective one of the feature vectors of the subset is processed.

While the multitude of feature vectors in a subset associated with a respective object may correspond to the same respective object, there may be a significant distribution, dispersion and/or variance between the feature vectors due to one or more variations in attributes of the images from which the feature vectors are extracted, for example, image quality, image resolution, scene illumination, object view angle, object size, transformations, loss function and/or the like.

In each iteration, a deviation of the respectively processed feature vector from an aggregated feature vector aggregating previously processed feature vectors of the subset is evaluated and determined. The deviation may be computed, for example, based on a distance (e.g. Euclidean distance, cosine distance, etc.) of the respective feature vector from a common center computed for the previously processed feature vectors.

In case the deviation of the respective feature vector from the aggregated feature vector is within a predefined value, for example, the distance of the respective feature vector from the common center is within a predefined distance, the respective feature vector may be used for adjusting the inter-class adaptive threshold computed for the respective object class. However, in case the deviation of the respective feature vector from the aggregated feature vector exceeds (no within) the predefined value, for example, the distance to the common center exceeds the predefined distance, the respective feature vector (regarded as an outlier) may be rejected and excluded from the computation of the inter-class adaptive threshold defined for the respective object class.

A threshold may be then computed for each feature vector of the subset which is within the predefined value from the aggregated feature vector. The threshold may typically enclose (encompass) the respective currently processed feature vector. Since the feature vectors are multi-dimensional, the threshold computed for the respective feature vector may be defined by a multi-dimensional spatial region enclosing the respective feature vector.

The inter-class adaptive threshold may be then adjusted to accurately and closely enclose the threshold computed for the respective feature vector. Similarly, the inter-class adaptive threshold may be defined by a multi-dimensional spatial region as is the threshold of each feature vector. The inter-class adaptive threshold may be therefore adjusted by adjusting a border line of the multi-dimensional spatial region defining the inter-class adaptive threshold to follow the border line of each multi-dimensional spatial region defining the threshold computed for each feature vector of the subset which was not rejected.

Through the iterative process the inter-class adaptive threshold may be thus continuously adjusted to enclose the thresholds computed for the feature vectors which are determined not to significantly deviate from the aggregated feature vector (i.e., their deviation is within the predefined value) thus expressing the inter-class behavior of the feature vectors associated with the respective object class.

The border line of the multi-dimensional spatial region defining the inter-class adaptive threshold may be further smoothed in order to remove one or more anomalies, irregularities and/or discrepancies in the spatial region border line.

The iterative process for computing the inter-class adaptive threshold may be repeated for each object associated with a respective subset comprising multiple feature vectors of the plurality of feature vectors.

The inter-class adaptive thresholds computed for one or more of the objects may then transmitted, delivered, provided and/or otherwise outputted. One or more new (unseen) feature vectors extracted by one or more of the ML model(s) from one or more images depicting one or more of the objects may be then mapped to the inter-class adaptive thresholds and classified accordingly to one of the objects.

Computing the inter-class adaptive thresholds for mapping feature vectors extracted by the ML model(s) for the objects and classifying the objects accordingly may present major advantages and benefits compared to existing methods and system for applying thresholds used for ML models classification.

First, using the inter-class adaptive thresholds may significantly increase the classification performance, for example, accuracy, reliability and/or robustness of the classification of the feature vectors extracted by the ML model(s) to classifying the feature vectors using fixed thresholds as may be done by some of the existing methods. ML model(s). Employing fixed size thresholds may present reduced classification performance since adjacent thresholds may have at least partially overlapping spatial regions making it impossible distinguish between the spatial regions of each of the adjacent thresholds each associated with a different class. In contrast, applying the inter-class adaptive thresholds may prevent such overlap thus significantly increasing classification performance of the feature vectors.

Moreover, some of the existing methods may apply adaptive thresholds for classifying the feature vectors extracted by the ML models such that each class may be associated with an individual respective threshold that may be different from the thresholds assigned to other classes. However, such adaptive thresholds may be still susceptible to overlapping regions since the shape of the spatial region defining each threshold may be a fixed shape and combined with the inherent variance and distribution of the feature vectors associated with each object, the spatial region defining the threshold computed for one or more of the classes may be very extensive and hence prone to overlapping with adjacent thresholds. On the other hand, the inter-class adaptive threshold computed for each class, is not defined by a fixed shape but is rather defined by a spatial region which closely follows the border line of the thresholds computed individually for each of the feature vectors of the respective subset. As the spatial regions defining the thresholds of the classes are not fixed and are highly correlated with the feature vectors extracted by the ML model(s) during training, each adaptive threshold may be specific to a respective class. As such the inter-class adaptive threshold is much more robust against overlaps between the spatial regions defining adjacent thresholds.

Furthermore, by rejecting the significantly deviating feature vectors from the computation of the inter-class adaptive thresholds, the adaptive thresholds may avoid stretching over spatial space(s) dictated by outliers thus distancing from each other the border lines of the spatial regions defining adjacent thresholds.

In addition, by using the inter-class adaptive thresholds to classify the feature vectors extracted by the ML model(s), the ML model(s) utilized for the object detection may be significantly less complex, for example, neural networks which are simpler (less deep) compared to the ML models used by the existing object detection and/or face recognition methods while maintaining high performance, accuracy, reliability and robustness of the object classification. This may significantly reduce the computing resources required for executing the reduced complexity ML model(s), for example, processing resources, storage resources, processing time and/or the like thus reducing time, costs and/or effort for deploying the ML model(s). Moreover, the reduced complexity ML model(s) may be trained using significantly reduced computing resources thus further reducing time, costs and/or effort for deploying the ML model(s).

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer program code comprising computer readable program instructions embodied on a computer readable medium may be transmitted using any appropriate medium, including but not limited to wireless, wire line, optical fiber cable, RF, etc., or any suitable combination of the foregoing.

The computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

The computer readable program instructions for carrying out operations of the present invention may be may be written in any combination of one or more programming languages, such as, for example, assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to the drawings, FIG. 1 is a flowchart of an exemplary process of computing an inter-class adaptive threshold for mapping feature vectors extracted by ML model(s) for a plurality of objects and classifying the objects accordingly, according to some embodiments of the present invention. An exemplary process 100 may be executed to compute an inter-class adaptive threshold for one or more objects each associated with multiple feature vectors used by one or more ML models to detect and classify objects, for example, faces of people.

Each ML model may be implemented using, for example, a neural network, an SVM and/or the like. In particular, the ML model(s) may utilize neural networks such as, for example, CNNs, specifically deep learning CNNs trained for object detection and/or face recognition.

Using the inter-class adaptive threshold may enable the ML models to classify the objects with increased accuracy and typically while employing reduced computing resources, for example, processing power, processing time, storage resources and/or the like for training and/or for runtime classification of newly presented feature vectors.

Figure 2:
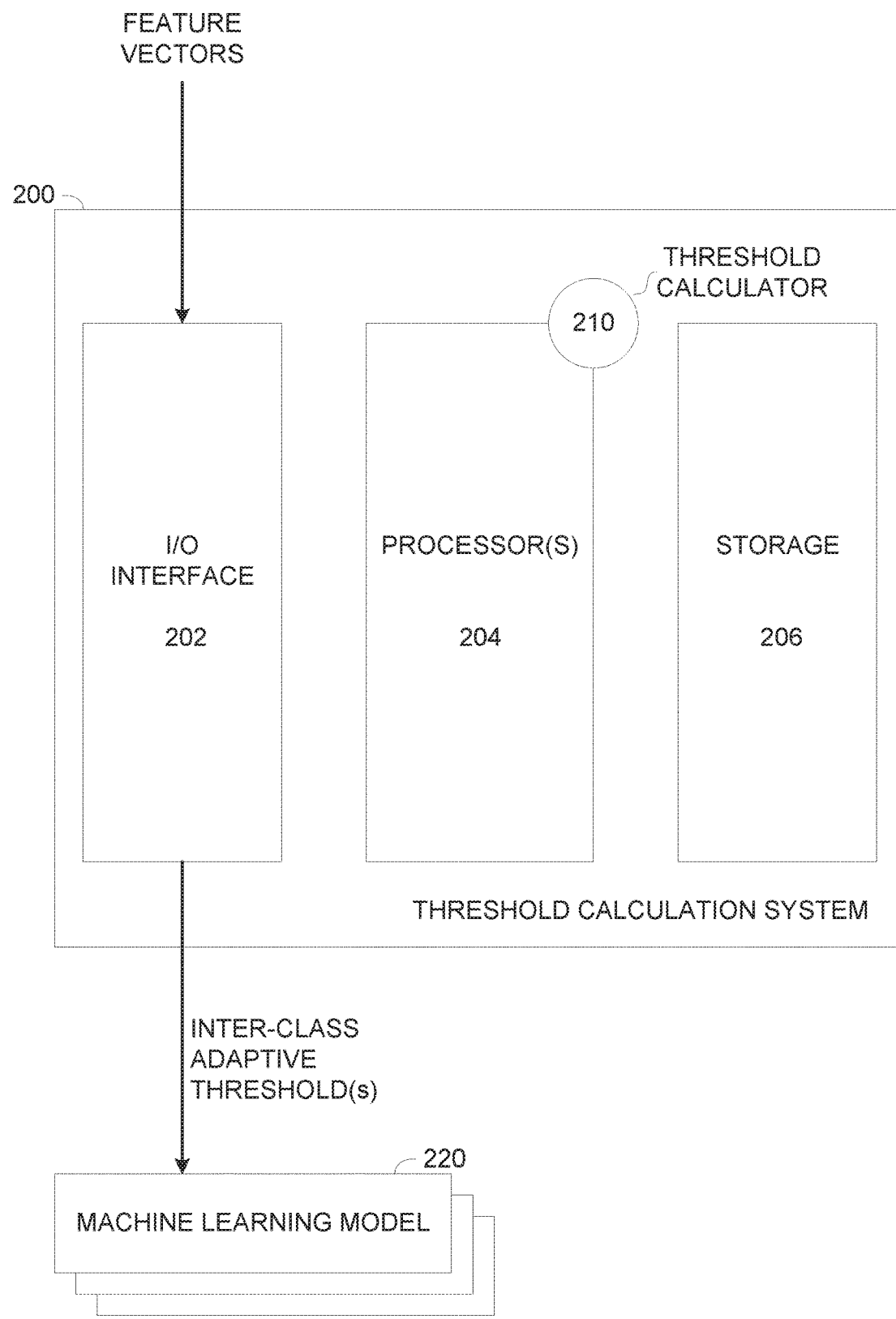
FIG. 2 is a schematic illustration of an exemplary system for computing an inter-class adaptive threshold for mapping feature vectors extracted by ML model(s) for a plurality of objects and classifying the objects accordingly, according to some embodiments of the present invention.

Reference is also made to FIG. 2, which is a schematic illustration of an exemplary system for computing an inter-class adaptive threshold for mapping feature vectors extracted by ML models for a plurality of objects and classifying the objects accordingly, according to some embodiments of the present invention. An exemplary threshold calculation system 200 may execute a process such as the process 100 for computing the inter-class adaptive threshold for one or more objects which are each associated with a plurality of feature vectors extracted from a ML model.

The threshold calculation system 200 may include an Input/Output (I/O) interface 202 for receiving a plurality of feature vectors associated with a plurality of objects and outputting the inter-class adaptive threshold(s) computed for one or more of the objects, a processor(s) 204 for executing the process 100 and a storage 206 for storing data and/or program (program store).

The I/O interface 202 may include one or more wired and/or wireless network interfaces for connecting to one or more wired and/or wireless networks, for example, a Local Area Network (LAN), a Wireless LAN (WLAN), a Wide Area Network (WAN), a Wide Area Network (WAN), a Municipal Area Network (MAN), a cellular network, the internet and/or the like.

The I/O interface 216 may further include one or more wired and/or wireless interfaces, for example, a Universal Serial Bus (USB) interface, a serial interface, a Bluetooth interface and/or the like to support attachment and/or pairing of one or more attachable devices, for example, a portable storage device (e.g. memory stick) and/or the like The processor(s) 204, homogenous or heterogeneous, may include one or more processors arranged for parallel processing, as clusters and/or as one or more multi core processor(s). The storage 206 may include one or more non-transitory persistent storage devices, for example, a Read Only Memory (ROM), a Flash array, a hard drive and/or the like. The storage 206 may also include one or more volatile devices, for example, a Random Access Memory (RAM) component, a cache memory and/or the like. The storage 206 may further include one or more network storage resources, for example, a storage server, a network accessible storage (NAS), a network drive, a cloud storage and/or the like accessible via the network interface 202.

The processor(s) 204 may execute one or more software modules such as, for example, a process, a script, an application, an agent, a utility, a tool and/or the like each comprising a plurality of program instructions stored in a non-transitory medium (program store) such as the storage 206 and executed by one or more processors such as the processor(s) 204. The processor(s) 204 may further utilize and/or facilitate one or more hardware modules (elements) integrated, coupled with and/or utilized by the threshold calculation system 200, for example, a circuit, a component, an Integrated Circuit (IC), an Application Specific Integrated Circuit (ASIC), a Field Programmable Gate Array (FPGA), a Digital Signals Processor (DSP) and/or the like.

The processor(s) 204 may therefore execute one or more functional modules, for example, a threshold calculator 210 utilized by one or more software modules, one or more of the hardware modules and/or a combination thereof for executing the process 100.

Optionally, the threshold calculation system 200, specifically the threshold calculator 210 and/or part thereof are implemented as one or more cloud computing services, for example, an Infrastructure as a Service (IaaS), a Platform as a Service (PaaS), a Software as a Service (SaaS) and/or the like such as, for example, Amazon Web Service (AWS), Google Cloud, Microsoft Azure and/or the like.

The ML model(s) 220 may utilize neural networks such as, for example, CNNs, specifically deep learning CNNs trained for object detection and/or face recognition. Such CNNs as known in the art may include, for example, LeNet, AlexNet, VGGNet, GoogLeNet, OverFeat, R-CNN, Fast R-CNN, Faster R-CNN, CosFace and/or the like.

The ML model(s) 220 may be trained to classify a plurality of objects, for example, faces of a plurality of people based on feature vectors associated with the faces based on thresholds computed during training as known in the art. In particular, the ML model(s) 220 may be applied to generate a plurality of features vectors comprising a plurality of features extracted for the plurality of objects (e.g. faces) and classify the objects according to mapping of the extracted feature vectors based on the thresholds.

Each of the feature vectors may be extracted from one or more images depicting the respective associated object (e.g. face) which is also known in the art. The feature vectors are multi-dimensional vectors having a number of dimensions corresponding to the number of the features. As the feature vectors are multi-dimensional, the thresholds may also be multi-dimensional thresholds defined by multi-dimensional spatial regions.

Some existing methods and system for implementing ML model(s) 220 may apply a fixed threshold for classifying the feature vectors to respective classes (labels).

Via the network interface 202, the threshold calculation system 200, specifically the threshold calculator 210 may communicate with one or more remote network resources to receive feature vectors, specifically training feature vectors extracted by one or more ML models 220 from images of a plurality of objects during one or more training sessions. Via the network interface 202, the threshold calculator 210 may further output inter-class adaptive thresholds computed for each of the plurality of objects.

The threshold calculator 210 may output the adaptive thresholds to one or more objects classifiers 230, for example, an algorithm, a tool, an ML model and/or the like which may map one or more new features vectors extracted by one or more ML models such as the ML models 220 to one of the adaptive thresholds. Based on the mapping, the object classifier 230 may classify the object associated with each mapped feature vector to a respective class according to the adaptive threshold in which the respective feature vector falls. Optionally, the objects classifier 230 is integrated with one or more of the ML models 220 such that the ML model(s) 220 extracts the feature vectors for the objects and classifies the objects according to the mapping of the respective feature vectors to adaptive thresholds computed for each of the objects.

Figure 3:
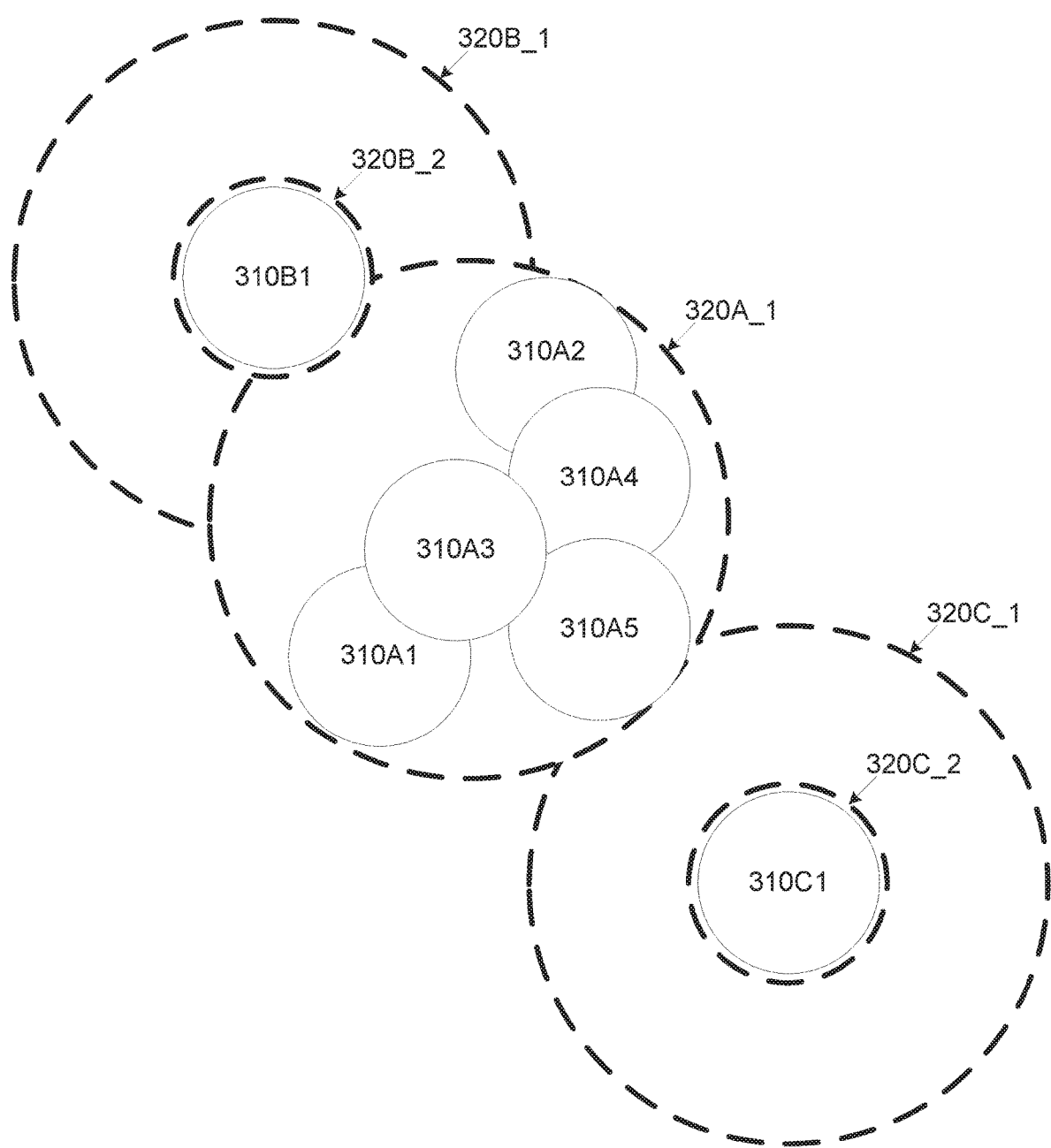
FIG. 3 is a schematic illustration of an exemplary fixed threshold applied for classifying feature vectors extracted by ML model(s) for a plurality of objects as known in the art.

Reference is now made to FIG. 3, which is a schematic illustration of an exemplary fixed threshold applied for o classifying feature vectors extracted by ML model(s) for a plurality of objects as known in the art. FIG. 3 presents a plurality of feature vectors 310 mapped in space. For brevity and clarity, the feature vectors 310 are mapped into a two dimensional space to create two dimensional thresholds. This, however should not be construed as limiting since the feature vectors 310 may be multi-dimensional vectors and as such may be mapped into a multi-dimensional space to create multi-dimensional thresholds.

As seen in FIG. 3, a plurality of feature vectors 310 may be associated with 3 different objects, for example, faces of three different people (persons). For example, feature vectors 310A1, 301A2, 310A3, 310A4 and 310A5 may be associated with a first object, for example, the face of a first person (first face). In another example, a feature vector 310B1 may be associated with a second object, for example, the face of a second (second face) and a feature vector 310C1 may be associated with a third object, for example, the face of a third person (third face).

As described herein before, the feature vectors 310 may typically be multi-dimensional vectors, however, for brevity the feature vectors 310 are described in two dimensions (2D). Similarly, the spatial regions defining thresholds 320 computed for the feature vectors 310 are also 2D regions. This however should not be construed as limiting since the spatial region may be a multi-dimensional region.

For example, a threshold 320A_1 computed for a first class (label), for example, the first face may be defined by a spatial region enclosing (encompassing) all the feature vectors 310A1, 301A2, 310A3, 310A4 and 310A5 associated with the first face. In another example, a threshold 320B_2 computed for a second class (label), for example, the second face may be defined by a spatial region enclosing (encompassing) the feature vector 310B1 associated with the second face. In another example, a threshold 320C_2 computed for a third class (label), for example, the third face may be defined by a spatial region enclosing (encompassing) the feature vector 310C1 associated with the third face.

In particular, the thresholds 320A_1, 320B_2 and 320C_2 as used by the existing method are defined by circular spatial regions having a radius defined to enclose (encompass) the feature vectors 320A, 320B and 320C respectively.

The thresholds 320 may be used for classifying additional, typically new (unseen) feature vectors 310 extracted by one or more ML models such as the ML model 220 such that each feature vector 310 is classified to one of the first, second and/or third classes according to the threshold 320 in which its falls.

The existing methods and system for implementing ML model(s) 220 which apply a fixed threshold for classifying the feature vectors as known in the art may therefore apply the same threshold for all classes, specifically the threshold defined by a largest spatial region. Since the threshold 320A_1 computed for the first class is defined by the largest spatial region compared to the other classes, the spatial region defining the threshold 320A_1 is selected to define the thresholds of all other classes, such that the threshold 320B 1 is defined for the second class and the threshold 320C 1 is defined for the third class.

As such, when classifying additional feature vectors 310, for example, by the object classifier 230, each feature vector 310 which falls within the threshold 320A_1 may be classified to the first class, each feature vector 310 which falls within the threshold 320B_1 may be classified to the second class and each feature vector 310 which falls within the threshold 320C_1 may be classified to the third class.

As evident, the thresholds 320A1, 320B_1 and 320C_1 overlap with each other. This means that classifying the feature vectors based on the fixed threshold ML may result in inaccurate classification of feature vectors 310 falling within the overlapping regions into a specific class and may yield a high classification error rate.

Other existing methods and system for implementing the ML model(s) 220 may therefore apply an adaptive threshold for classifying the feature vectors to respective classes such that a different threshold may be computed for each of the classes.

Figure 4:
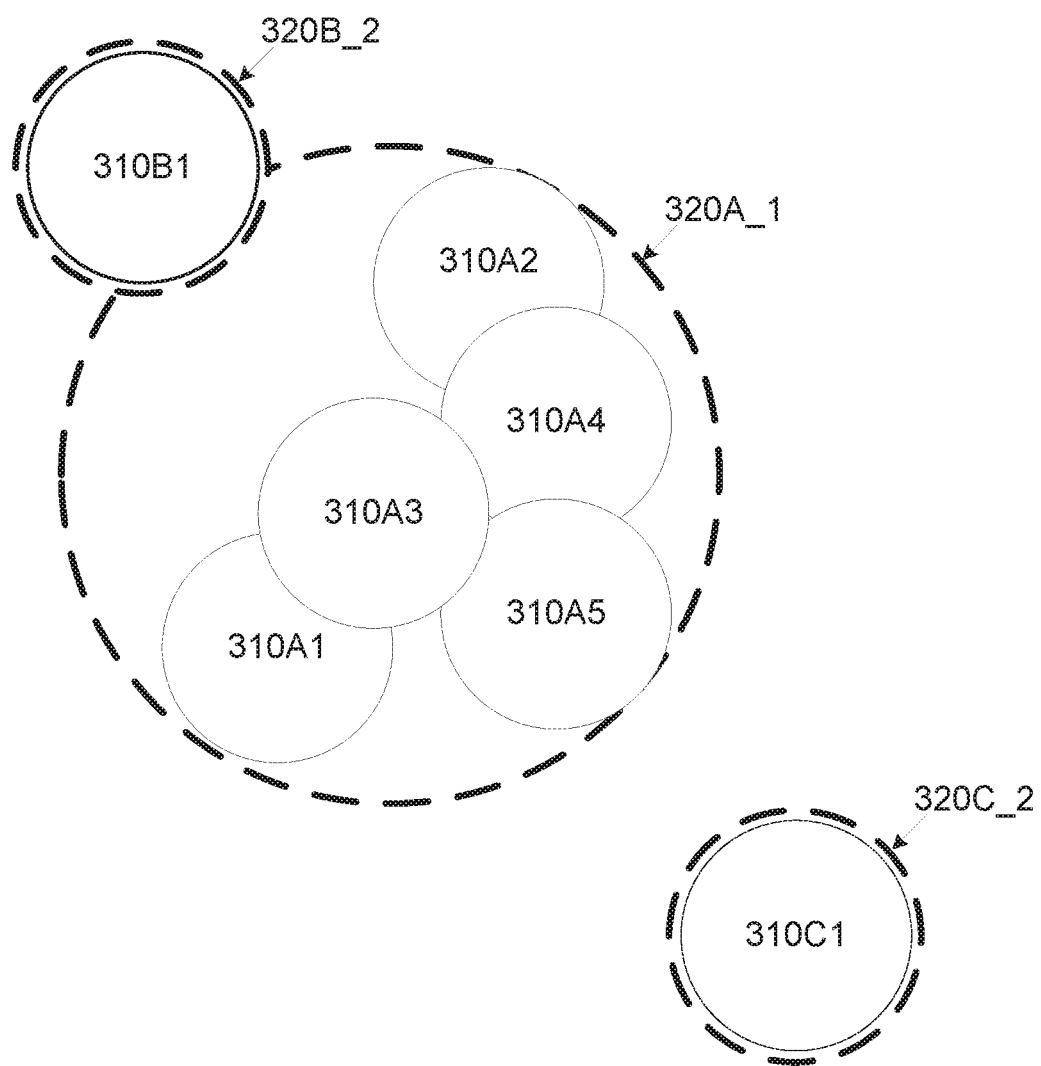
FIG. 4 is a schematic illustration of an exemplary adaptive threshold computed for ML models classifying feature vectors extracted by ML model(s) for a plurality of objects as known in the art.

Reference is now made to FIG. 4, which is a schematic illustration of an exemplary adaptive threshold computed for classifying feature vectors extracted by ML model(s) for a plurality of objects as known in the art. As described for FIG. 3, while for brevity and clarity, FIG. 4 presents a plurality of feature vectors 310 mapped to create two dimensional thresholds, it should not be construed as limiting since the feature vectors 310 may be multi-dimensional vectors mapped to create multi-dimensional thresholds.

While fixed threshold classification methods and systems may use thresholds such as the threshold 320 which are defined by a fixed spatial region such as, for example, the threshold 320A_1, the adaptive threshold classification methods and systems may employ different thresholds 320 each adapted for a respective one of the classes and defined by a different spatial region computed according to feature vectors such as the feature vectors 310 associated with each of the classes.

As described in FIG. 3, the threshold 320A_1 computed for the first class may be defined by a spatial region enclosing all the feature vectors 310A1, 301A2, 310A3, 310A4 and 310A5 associated with the first face. A threshold 320B_2 computed for the second class may be defined by a spatial region enclosing the feature vector 310B1 associated with the second face and a threshold 320C_2 computed for the third class may be defined by a spatial region enclosing the feature vector 310C1 associated with the third face.

Instead of setting thresholds defined by a common spatial region, for example, the threshold 320A_1, 320B_1 and 320C_1 for the first class, the second class and the third class respectively as done by the fixed threshold classification, the adaptive threshold classification may be based on different thresholds 320 each defined for a respective one of the classes. For example, the threshold 320A1 may be applied for the first class, the threshold 320B_2 may be applied for the second class and the threshold 320C_2 may be applied for the third class.

As described herein above, when classifying additional feature vectors 310 extracted by the ML model(s) 220, the object classifier 230 may thus classify each feature vector 310 which falls within the threshold 320A_1 to the first class, each feature vector 310 which falls within the threshold 320B 2 to the second class and each feature vector 310 which falls within the threshold 320C 2 to the third class.

As evident, some of the thresholds, specifically the thresholds 320A1 and the threshold 320B_2 still share some overlapping regions which may result in inability of the object classifier 230 using the adaptive thresholds to accurately classify feature vectors 310 falling within the overlapping regions into a specific class and may yield a high classification error rate.

The process 100 executed by the threshold calculator 210 is therefore configured and adapted to overcome the limitations of the thresholds used by the existing methods by computing an inter-class adaptive threshold for each of the objects such that the algorithm 220 may be able to distinctively classify each feature vector to a respective class with significantly increased accuracy, reliability and definiteness.

As shown at 102, the process 100 starts with the threshold calculator 210 receiving a plurality of features vectors associated with a plurality of objects where each of the objects may be associated with one or more feature vectors. Specifically, the received feature vectors may include training feature vectors extracted by one or more ML models such as the ML model 220 for the plurality of objects (e.g. faces) during one or more training sessions in which the ML model(s) 220 is trained with a dataset comprising a plurality of training samples, for example, images of a plurality of objects, faces and/or the like.

The threshold calculator 210 may receive the plurality of feature vectors and/or part thereof from one or more sources. For example, the threshold calculator 210 may receive the plurality of feature vectors and/or part thereof from one or more remote network connected resources one or more via one or more of the network interfaces provided by the I/O interface 202. In another example, the threshold calculator 210 may retrieve the plurality of feature vectors and/or part thereof from one or more attachable devices attached to one or more of the interfaces provided by the I/O interface 202

The feature vectors are multi-dimensional vectors having a number of dimensions corresponding to the number of the features. The features in each feature vector may be extracted as known in the art from an image depicting a respective object associated with the respective feature vector.

The type of the objects is naturally dependent and derived from the nature of the object detection application and the nature of the object classifier 230. For example, in case the object classifier 230 is applied for face recognition, the plurality of objects may include faces of a plurality of people. In another example, in case the object classifier 230 is applied for autonomous vehicle control, the plurality of objects may include objects encountered in a driving environment, for example, people (pedestrians), animals (pets, street animals, etc.), vehicles (cars, tracks, trains, motorcycles, bicycles, etc.). flora (i.e., plants), inanimate objects such as structures, traffic infrastructure objects (e.g. traffic light, sign, sign pole, etc.) and/or the like.

As shown at 104, for each of the plurality of objects which is associated with a subset comprising multiple feature vectors of the plurality of received feature vectors, the threshold calculator 210 initiates the iterative process 104 for computing an inter-class adaptive threshold for classifying the respective object.

The iterative process 104 is applied only for objects associated with multiple feature vectors since the inter-class adaptive threshold is computed based on multiple feature vectors while the threshold computed for classifying objects having a single feature vector may overlap with the single feature vector and is therefore not the focus of the present invention.

In each iteration of the iterative process 104, the threshold calculator 210 may process a respective feature vector of the subset of feature vectors associated with the respective object.

As shown at 106, the threshold calculator 210 may compute a deviation of the respective feature vector from an aggregated feature vector computed for the class of the respective object by aggregating the feature vectors of the subset which were previously processed in one or more previous iterations of the process 104.

Respective features included in the feature vectors of the subset associated with the respective object may have a variation of values since they may be extracted from different images of the respective object and mat be therefore affected by various attributes of their respective images as known in the art, for example, image quality, image resolution, scene illumination, object view angle, object size, transformations and/or the like. The feature vectors of the subset may therefore present a distribution and/or dispersion in the multi-dimensional space.

The threshold calculator 210 may therefore compute an aggregated feature vector based on the feature vectors processed in the previous iterations of the process 104 and may updated in each iteration. For example, the aggregated feature vector computed by the threshold calculator 210 may be defined as a common center of the plurality of previously processed feature vectors.

The threshold calculator 210 may then compute the distance of the currently processed feature vector (processed in the current iteration) from the common center, for example, a Euclidean distance, in particular a multi-dimensional Euclidean distance. In another example, the threshold calculator 210 may compute the distance of the currently processed feature vector (processed in the current iteration) from the common center according to a cosine distance.

As shown at 108, which is a conditional step, in case the deviation of the respective feature vector from the aggregated feature vector is within a predefined value, the threshold calculator 210 may branch to 112. However, in case the deviation of the respective feature vector from the aggregated feature vector exceeds (not within) the predefined value, the threshold calculator 210 may branch to 110. The predefined value may be determined based on the features vectors extracted by the ML model(s) 220. The predefined value may further depend on the multi-dimensional field represented by the feature vectors. Feature vectors extracted by a poorly trained ML model(s) may comprise significant noise which may cause such feature vectors to be incorrectly mapped in the multi-dimension space potentially to regions of other unrelated classes. Hence the predefined value may be determined by the training and strength of the ML model that extracted the feature vectors. In one example, the predefined value may be half the distance to the closest feature vector of another class, for example, an adjacent class.

For example, in case the aggregated feature vector is utilized by the common center, in case the distance of the respective feature vector exceeds the predefined value, the threshold calculator 210 may branch to 110 while in case the distance is within the predefined value, the threshold calculator 210 may branch to 112. The threshold calculator 210 may apply one or more computations for computing the distance of the respective feature vector from the aggregated feature vector, for example, the common center.

Assuming the predefined distance value is $D_{max}$ for a certain class designated C, the threshold calculator 210 may compute the distance D(x) of the respective feature vector x of a plurality of feature vectors X from the common center to the predefined distance $D_{max}$. In case $D(x) > D_{max}$, the threshold calculator 210 may branch to 110 and in case $D(x) < D_{max}$, the threshold calculator 210 may branch to 112.

As shown at 110, the threshold calculator 210 may reject (discard) the respective feature vector (processed in the current iteration) which significantly deviates from the aggregated feature vector, i.e. its deviation exceeds the predefined value. Such feature vector which significantly deviates from the aggregated feature vector may be thus considered an outlier which may be thus discarded.

As shown at 112, the threshold calculator 210 may compute a threshold for the respective feature vector having a deviation which is within the predefined value from the aggregated feature vector, for example, the common center. The threshold calculator 210 may apply one or more methods, implementations and/or computations for computing the threshold for the feature vector which may typically enclose (encompass) the respective feature vector as described herein before.

For example, the threshold calculator 210 may compute the threshold T(C) for the respective class C based on the distance D(x) of the respective class C and the feature vectors X from the common center according to equation 1 below.

$$T(C) = a*D(x) + T_m \qquad \text{Equation 1}$$

Where a is a constant fit for each class C using the common center of the feature vectors X and $T_m$ is a minimum threshold defined for the ML model(s).

As shown at 114, the threshold calculator 210 may adjust the inter-class adaptive threshold computed for the class of the respective object in the plurality of iterations of the process 104 according to the threshold computed for the respective feature vector.

The threshold calculator 210 may adjust the inter-class adaptive threshold by adjusting a border line of the multi-dimensional spatial region defining the inter-class adaptive threshold to follow the border line of the multi-dimensional spatial region defining the threshold computed for the respective feature vectors of class C.

Additionally and/or Alternatively, instead of rejecting the respective feature vector which significantly deviates from the aggregated feature vector the threshold calculator 210 may nullify the use of the respective feature vector in the calculation of the threshold T(C) such that the respective feature vector has no contribution for the computation and/or adjustment of the inter-class adaptive threshold.

As evident, either by rejecting (discarding) the deviating respective feature vector and/or by nullifying its respective threshold, the respective feature vector is excluded and not used for computing and/or adjusting the inter-class adaptive threshold.

The threshold calculator 210 may further apply one or more smoothing functions, algorithms and/or techniques as known in the art for smoothing the border line of the multi-dimensional spatial region defining the inter-class adaptive threshold in order to remove one or more anomalies, irregularities and/or discrepancies in the spatial region border line.

As shown at 116, which is another conditional step, the threshold calculator 210 may initiate another iteration in case there are one or more feature vectors in the subset associated with the respective object which are not processed. In such case the threshold calculator 210 may branch to 106 to start another iteration for another unprocessed respective feature vector. In case all feature vectors included in the subset associated with the respective object are processed, the threshold calculator 210 may branch to 118.

As stated herein before, the process 104 may be repeated for computing an inter-class adaptive threshold individually adjusted for classifying each of the plurality of objects which is associated with a respective subset comprising multiple feature vectors of the plurality of feature vectors.

As shown at 118, the threshold calculator 210 may output the inter-class adaptive threshold computed for each of the objects associated with multiple feature vectors.

The inter-class adaptive threshold(s) may be used by one or more of the object classifiers 230, for example, an algorithm, a tool, an ML model and/or the like to classify objects associated with one or more new (unseen) feature vectors extracted by one or more of the ML model(s) 220 from one or more images depicting one or more of the objects. Specifically, the object classifier 230 may map each new feature vector to the multi-dimensional space in which the multi-dimensional inter-class adaptive thresholds are defined. The object classifier 230 may then classify the object associated with the respective feature vector to the class associated with the inter-class adaptive threshold in which the respective feature vector falls.

Figure 5:
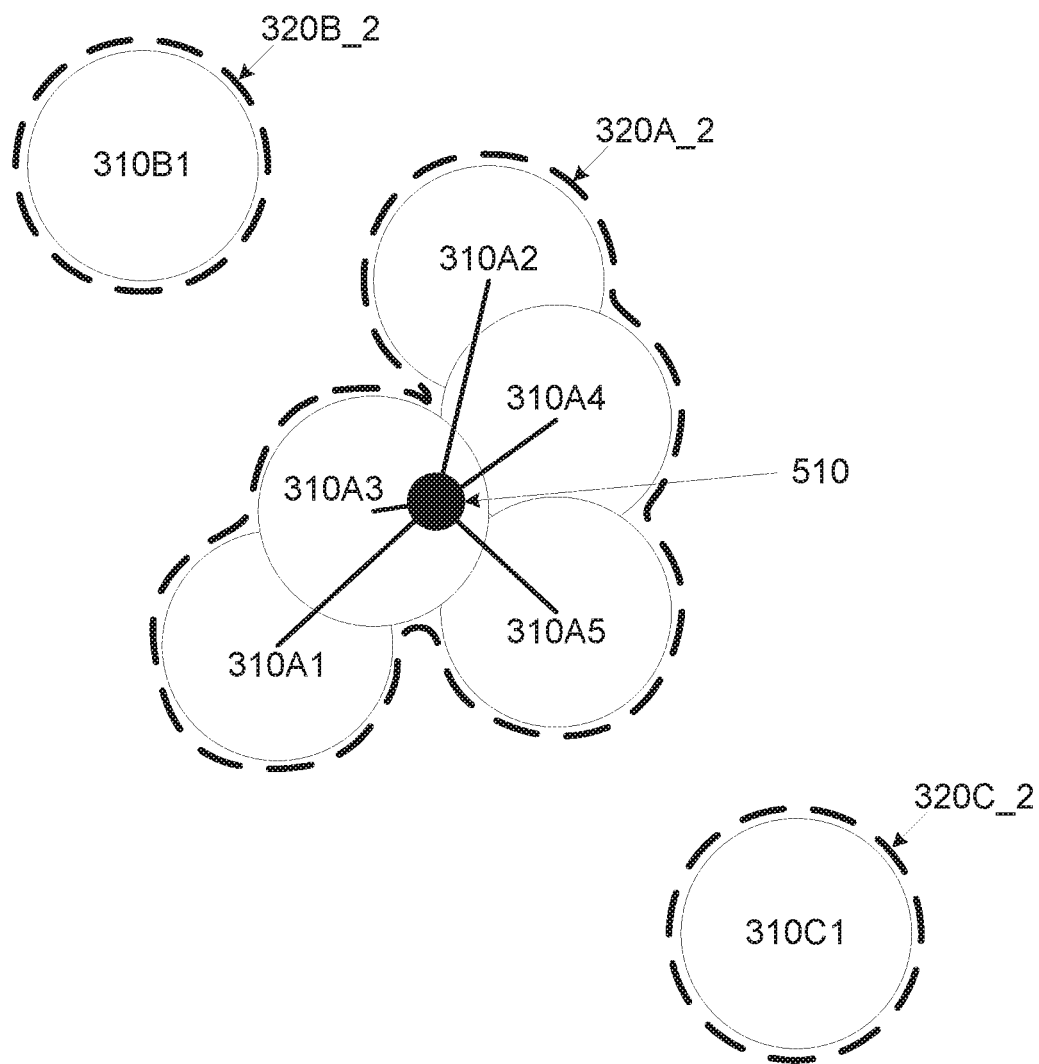
FIG. 5 is a schematic illustration of an exemplary enhanced exemplary adaptive threshold computed for classifying feature vectors extracted by ML model(s) for a plurality of objects, according to some embodiments of the present invention.
Figure 6:
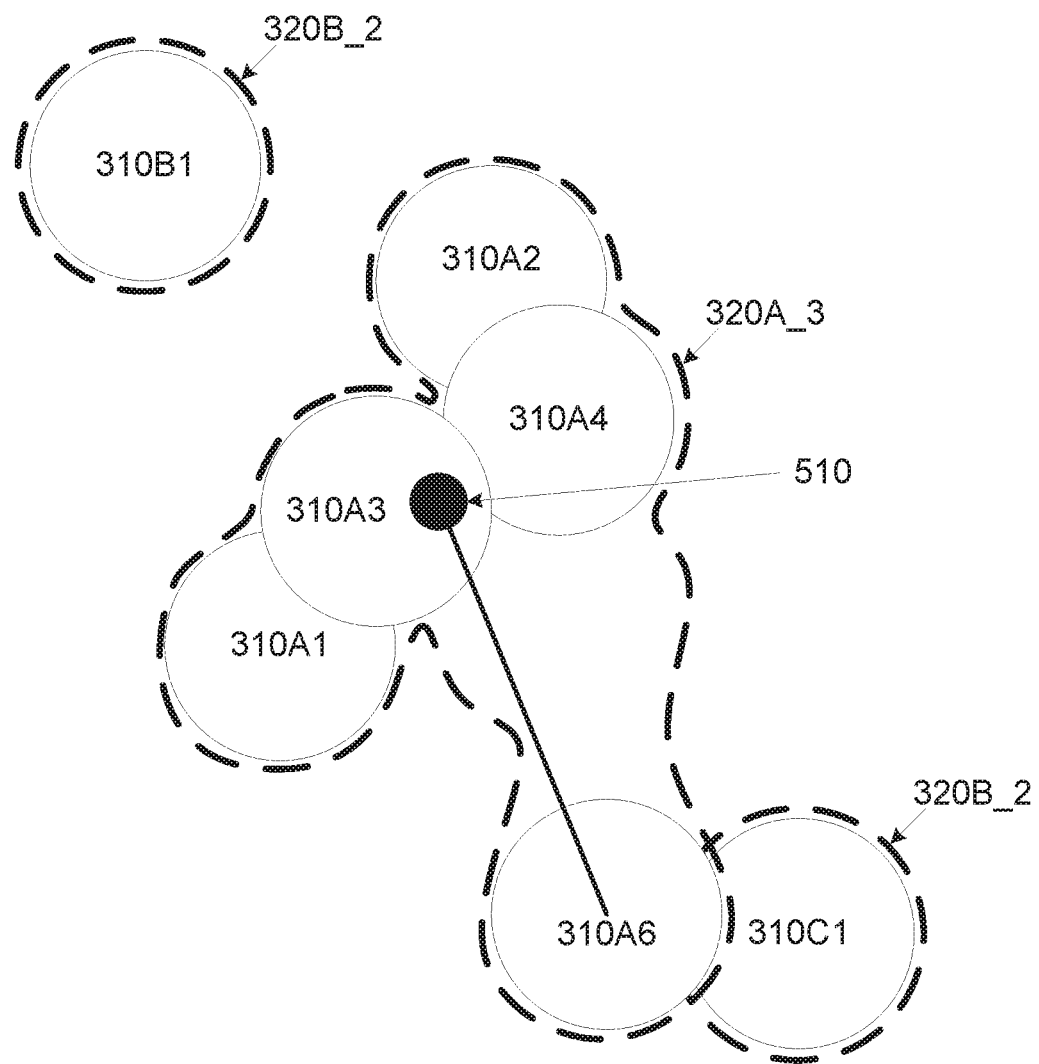
FIG. 6 is a schematic illustration of an exemplary enhanced exemplary adaptive threshold computed for classifying feature vectors extracted by ML model(s) for a plurality of objects which is adjusted to exclude deviating feature vectors, according to some embodiments of the present invention.

Reference in now made to FIG. 5, which is a schematic illustration of an exemplary enhanced exemplary adaptive threshold computed for classifying feature vectors extracted by ML model(s) for a plurality of objects, according to some embodiments of the present invention. Reference in also made to FIG. 6, which is a schematic illustration of an exemplary enhanced exemplary adaptive threshold computed for classifying feature vectors extracted by ML model(s) for a plurality of objects which is adjusted to exclude deviating feature vectors, according to some embodiments of the present invention.

As described for FIG. 3, while for brevity and clarity FIG. 5 and FIG. 6 present a plurality of feature vectors 310 mapped to create two dimensional adaptive thresholds, it should not be construed as limiting since the feature vectors 310 may be multi-dimensional vectors mapped to create multi-dimensional adaptive thresholds.

Continuing the previous classification example, a threshold 320B_2 computed for the second class may be defined by the spatial region enclosing a single feature vector 310B1 associated with the second face and a threshold 320C_2 computed for the third class may be defined by a spatial region enclosing a single feature vector 310C1 associated with the third face.

However, instead of computing a circular spatial region as defined for the threshold 320A_1, the calculator 210 may compute and/or adjust an inter-class adaptive threshold 320A_2 for the first class by computing a spatial region which follows the boundary lines of the feature vectors 310A associated with the first face, i.e., 310A1, 310A2, 310A3, 310A4 and 310A5.

In particular, as shown in FIG. 5, the threshold calculator 210 may first compute the deviation of each of the feature vectors 310A associated with the first class from the aggregated feature vector computed for the feature vectors 310A associated with the first face. For example, assuming the deviation is computed based on the distance of each respective feature vector 310A from a common center 510. In a first iteration of the process 104, the threshold calculator 210 may set the center of the feature vector 310A1 as the common center 510. In a second iteration of the process 104, the threshold calculator 210 may adjust the common center 510 according to the feature vector 310A2 and compute the distance of the feature vector 310A2 from the common center 510. In a third iteration of the process 104, the threshold calculator 210 may adjust the common center 510 according to the feature vector 310A3 and compute the distance of the feature vector 310A3 from the common center 510. The threshold calculator 210 may repeat the iterative process 104 for all feature vectors 310A associated with the first face which are included in the subset.

Assuming that threshold calculator 210 determined that the distance of all the feature vectors 310A1, 310A2, 310A3, 310A4 and 310A5 from the common center 510 is within the predefined maximum distance value (e.g., $D_{max}$). In such case the threshold calculator 210 may adjust the spatial region defining the inter-class adaptive threshold 320A_2 to include (enclose) the spatial regions defining the thresholds computed for the plurality of feature vectors 310A1, 310A2, 310A3, 310A4 and 310A5.

However, as shown in FIG. 6, the threshold calculator 210 computing the distance of the feature vectors 310A from the common center 510 may determine that the distance of all a feature vector 310A6 from the common center 510 exceeds the predefined maximum distance value (e.g., $D_{max}$) as described in step 108 of the process 100. In such case the threshold calculator 210 may reject the feature vector 310A6 and exclude it from the computation and/or adjustment of the inter-class adaptive threshold computed for classifying the first class. The inter-class adaptive threshold 320A computed for the first class may be therefore adjusted only based on the thresholds computed for the feature vectors 310A1, 310A2, 310A3, 310A4 and 310A5 determined to be within the predefined value form the common center and may be therefore similar to the inter-class adaptive threshold 320A_2.

As seen in FIG. 6, in case the threshold calculator 210 would not reject the feature vector 310A6 and adjust the inter-class adaptive threshold 320A according to the threshold computed for the feature vector 310A6, an inter-class adaptive threshold 320A_3 may be computed and/or adjusted for the first class where the spatial region defining the inter-class adaptive threshold 320A_3 includes (encloses) the spatial regions defining the thresholds computed for the feature vectors 310A1, 310A2, 310A3, 310A4, 310A5 and 310A6.

As evident in FIG. 6, in such case the inter-class adaptive threshold 320A_3 defined for the first class, it may overlap with the threshold 320B_2 defined for the third class. The object classifier 230 using the inter-class adaptive threshold 320A_3 may be therefore unable to accurately classify feature vectors 310 falling within the overlapping region into the first class or the third class and may thus yield a high classification error rate.

Therefore, rejecting the feature vector(s) which significantly deviate from the (outlier(s)) computation of the inter-class adaptive threshold to produce the inter-class adaptive threshold 320A_2 may significantly improve performance of the object classification which is based on the inter-class adaptive threshold 320A_2 in terms of increased accuracy, increased confidence level, reduced error rate and/or the like.

It is expected that during the life of a patent maturing from this application many relevant systems, methods and computer programs will be developed and the scope of the terms ML models and neural networks are intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, an instance or an illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals there between.

The word "exemplary" is used herein to mean "serving as an example, an instance or an illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A computer implemented method of applying adaptive classes thresholds to enhance object detection Machine Learning (ML) models, comprising:
   receiving a plurality of labeled feature vectors extracted from a plurality of images associated with a plurality of objects, at least one subset of the plurality of feature vectors is associated with a respective one of the plurality of objects and labeled accordingly;
   computing an adaptive threshold for the respective object in a plurality of iterations each for a respective one of the feature vectors of the subset, each iteration comprising:
      computing a deviation of the respective feature vector from an aggregated feature vector aggregating all previously processed feature vectors of the subset,
      computing, in case the deviation is within a predefined value, a threshold enclosing the respective feature vector by applying at least one ML model to compute similarity with each of the plurality of feature vectors not associated with the respective object, and
      adjusting the adaptive threshold to enclose the threshold of the respective feature vector; and
   outputting the adaptive threshold for classifying at least one unlabeled feature vector extracted by at least one ML model from at least one query image to a class of the respective object in case the at least one unlabeled feature vector falls within the adaptive threshold of the respective object.

2. The computer implemented method of claim 1, wherein the plurality of objects are faces of people such that the at least one ML model is configured and trained for face recognition.

3. The computer implemented method of claim 1, wherein the at least one ML model is a neural network.

4. The computer implemented method of claim 1, wherein the aggregated feature vector is a common center computed based on the previously processed feature vectors of the subset and the deviation is computed based on a distance of the respective feature vector from the common center.

5. The computer implemented method of claim 1, wherein the threshold and the adaptive threshold define respective multi-dimensional spatial regions having a plurality of dimensions corresponding to the number of features in the plurality of feature vectors.

6. The computer implemented method of claim 1, wherein adjusting the adaptive threshold to enclose the threshold of the respective feature vector comprising adjusting a border line of the multi-dimensional spatial region defining the adaptive threshold to follow the border line of the multi-dimensional spatial region defining the threshold computed for the respective feature vector.

7. The computer implemented method of claim 6, further comprising smoothing the border line of the multi-dimensional spatial region defining the adaptive threshold.

8. The computer implemented method of claim 1, wherein a respective adaptive threshold is individually adjusted for each of the plurality of objects by adjusting the respective adaptive threshold according to the threshold computed for each feature vector of the plurality of features vectors associated with the respective object having a deviation from a respective aggregated feature vector which is within the predefined value.

9. A system for applying adaptive classes thresholds to enhance object detection Machine Learning (ML) models, comprising:
   at least one processor executing a code, the code comprising:
      code instructions to receive a plurality of labeled feature vectors extracted from a plurality of images associated with a plurality of objects, at least one subset of the plurality of feature vectors is associated with a respective one of the plurality of objects and labeled accordingly:
      code instructions to compute an adaptive threshold for the respective object in a plurality of iterations each conducted for a respective one of the feature vectors of the subset, each iteration comprising:
      computing a deviation of the respective feature vector from an aggregated feature vector aggregating all previously processed feature vectors of the subset,
      computing, in case the deviation is within a predefined value, a threshold enclosing the respective feature vector by applying at least one ML model to compute similarity with each of the plurality of feature vectors not associated with the respective object, and
      adjusting the adaptive threshold to enclose the threshold of the respective feature vector; and code instructions to output the adaptive threshold for classifying at least one unlabeled feature vector extracted by at least one ML model from at least one query image to a class of the respective object in case the at least one unlabeled feature vector falls within the adaptive threshold of the respective object.

* * * * *